(12) United States Patent
Knudsen et al.

(10) Patent No.: US 6,678,212 B2
(45) Date of Patent: *Jan. 13, 2004

(54) SEISMIC CABLES AND A METHOD FOR MANUFACTURING SUCH

(75) Inventors: Anton Marius Knudsen, Ener Haugen (NO); Jorn Wardeberg, Billingstadasen (NO)

(73) Assignee: Nexans, Paris (FR)

( * ) Notice: Subject to any disclaimer, the term of this patent is extended or adjusted under 35 U.S.C. 154(b) by 35 days.

This patent is subject to a terminal disclaimer.

(21) Appl. No.: 10/024,575

(22) Filed: Dec. 21, 2001

(65) Prior Publication Data

US 2002/0114219 A1 Aug. 22, 2002

Related U.S. Application Data

(63) Continuation of application No. 09/334,683, filed on Jun. 17, 1999, now Pat. No. 6,333,898.

(30) Foreign Application Priority Data

Jun. 19, 1998 (NO) ................................................ 982889

(51) Int. Cl.$^7$ .............................. G01V 1/38; G01V 1/16
(52) U.S. Cl. ........................ 367/154; 367/20; 174/101.5
(58) Field of Search ................. 367/20, 154; 174/101.5

(56) References Cited

U.S. PATENT DOCUMENTS

| | | | | |
|---|---|---|---|---|
| 2,738,488 A | * | 3/1956 | MacKnight | 367/20 |
| 3,634,607 A | * | 1/1972 | Coleman | 174/120 R |
| 4,078,223 A | | 3/1978 | Strange | |
| 4,185,264 A | * | 1/1980 | Chrastina | 174/101.5 |
| 4,491,939 A | * | 1/1985 | Carpenter | 367/20 |
| 4,552,432 A | | 11/1985 | Anderson et al. | |
| 4,952,012 A | * | 8/1990 | Stamnitz | 385/101 |
| 6,069,841 A | * | 5/2000 | Johnston | 367/20 |
| 6,091,670 A | | 7/2000 | Oliver et al. | |
| 6,108,274 A | | 8/2000 | Pearce | |
| 6,333,898 B1 | * | 12/2001 | Knudsen et al. | 367/157 |

* cited by examiner

*Primary Examiner*—Ian J. Lobo
(74) *Attorney, Agent, or Firm*—Sughrue Mion, PLLC

(57) ABSTRACT

A seismic cable (1) and a method of manufacturing such a cable. The cable includes a plurality of elongated electrical/optical elements which are arranged to be interconnected with a number of seismic sensor devices arranged at intervals along the cable. A polymeric sheath and a protective outer armoring surround the elements to provide protection against radial stress of said cable. The sensor devices are installed outside of the elements and the armoring.

16 Claims, 6 Drawing Sheets

SEISMIC CABLES AND A METHOD FOR MANUFACTURING SUCH

This is a continuation of U.S. patent application Ser. No. 09/334,683 filed Jun. 17, 1999, now U.S. Pat. No. 6,333,898, the disclosure of which is incorporated reference.

DESCRIPTION

The present invention relates to seismic cables in general and in particular to seabed laid seismic cables. Such cables are arranged to be installed in arrays to cover a certain area on the seabed. The seismic cables are designed to detect sound wave signals reflected from subsea oil and gas reservoirs when air guns are detonated in the sea.

The seismic cables include a number of sensor devices which are powered from a surface vessel. The array of seabed seismic cables may also include electronic units for signal processing. The cables therefore also include power conductors for the electronic units and for the sensors, as well as signal conductors for interconnections and transmitting processed signals detected by the sensors to the vessel.

The object of the present invention is to provide an improved seabed laid seismic cable which can be manufactured in long lengths. The main features of the invention are defined in the accompanying claims. With this invention a type of seismic cable has been obtained, which is suitable for installation on the seabed and which can be connected in arrays.

BRIEF DESCRIPTION OF THE DRAWINGS

Above mentioned and other features and objects of the present invention will clearly appear from the following detailed description of embodiments of the invention taken in conjunction with the drawings where FIG. 1 schematically illustrates a cross section of a cable.

DETAILED DESCRIPTION OF THE INVENTION

Figure 1:
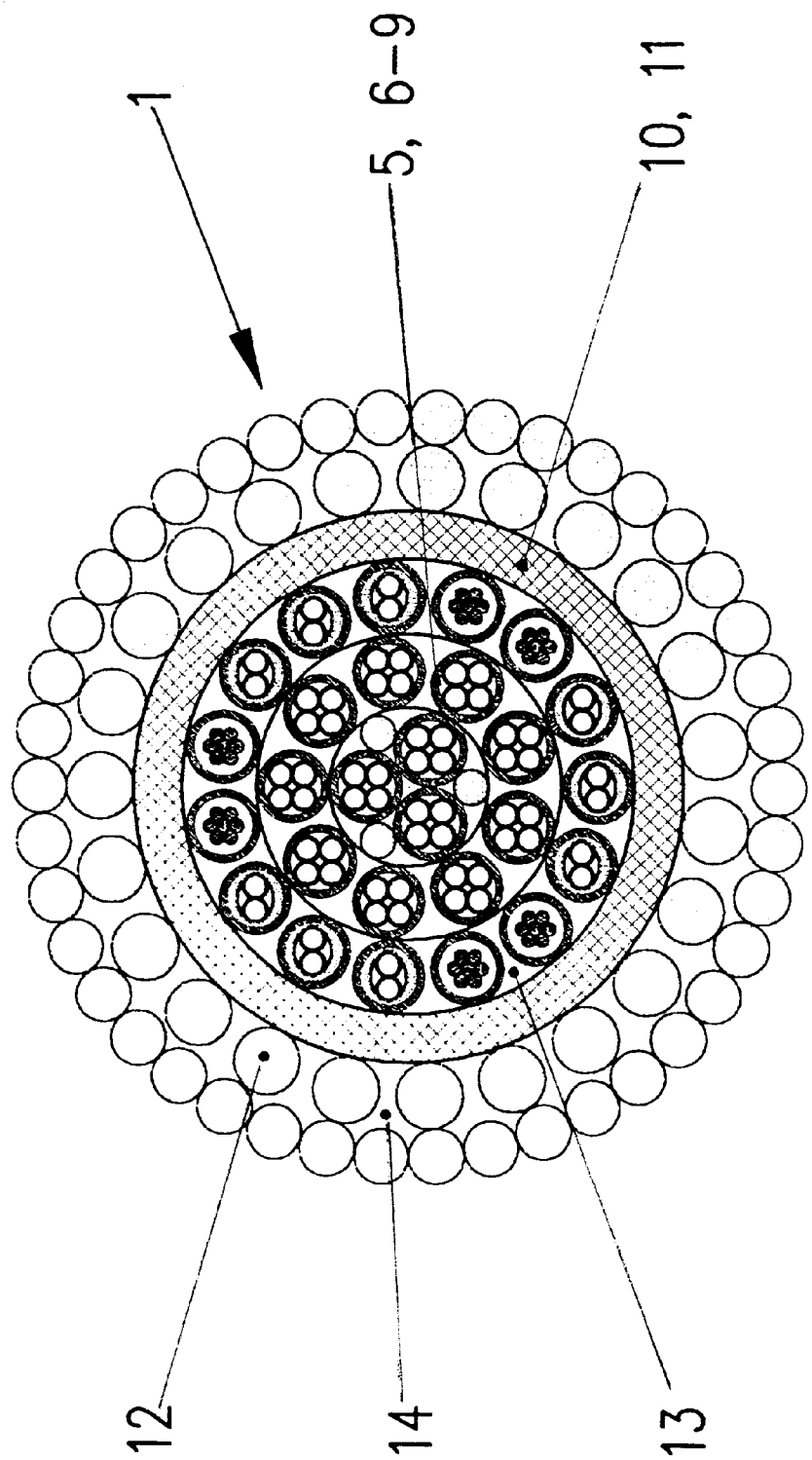

In FIG. 1, which is not drawn to scale, the sensor cable 1 corresponding to the invention includes power and signal conductors 5 (electrical and/or optical). These conductors 5 which may include pairs 6, quads 7 or other conductor elements 8 and 9 may be stranded helically or SZ-wise, but they may also be arranged axially.

All the conductors will be wrapped by a tape 10 made of a polymeric material and a protective inner sheath 11 made e.g. of thermoplastic polyester, which will be surrounded by an armouring 12, e.g. made of stranded steel wires. The interstices 13 in the cable core may be filled with a water blocking compound, such as petroleum jelly, the interstices 14 in the armouring are filled with a bitumen compound.

Figure 2:
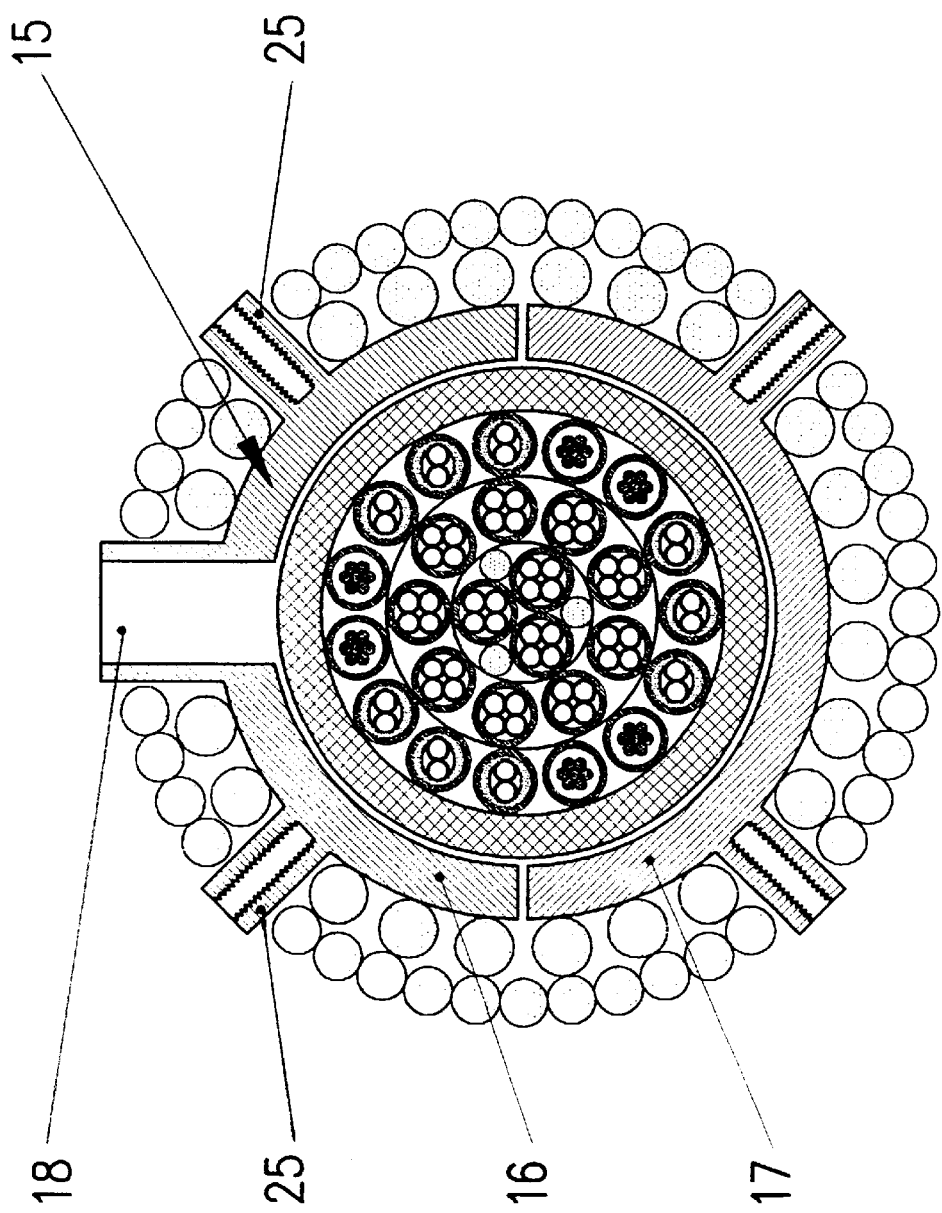
FIG. 2 illustrates a cross section of the same cable where a sleeve surrounds the cable core.
Figure 3:
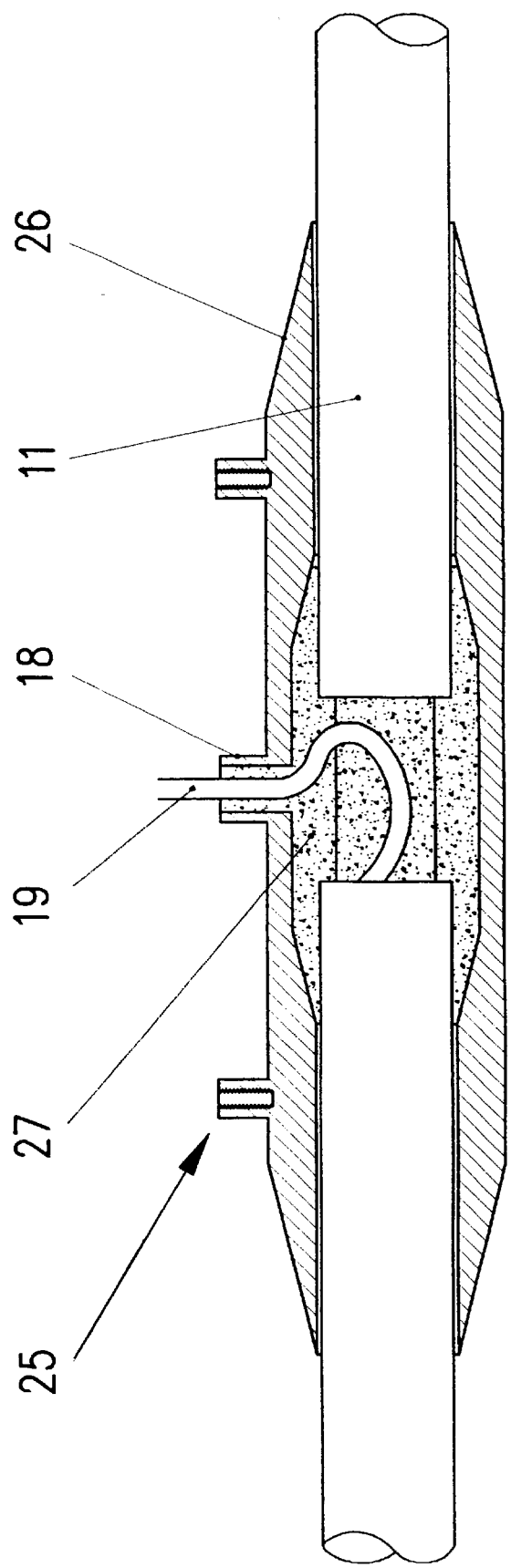
FIG. 3 illustrates a side view of the said sleeve integrated in the cable corresponding to FIG. 2.

A seismic cable corresponding to the invention includes a number of electrical/optical elements 7, 8, 9 which are arranged to be interconnected with a number of seismic sensor devices, e.g. geophones and hydrophones, amplifiers etc., arranged at intervals along the cable. As corresponding to the invention these sensor devices are installed outside of the elements 5 and the armouring 12 at intervals along the cable there are arranged sleeves 15 (FIG. 2) surrounding the elements 5. These sleeves 15 consist of two interlockable halves 16 and 17 having at least one outlet 18 for electrical/optical elements 19 (FIG. 3) of the elements 5 in the cable core. To adjust the outer configuration of the sleeves 15 to the cable core covered by the sleeves at intervals these sleeves 15 have conical end portions 26, as shown in FIG. 3.

Figure 4:
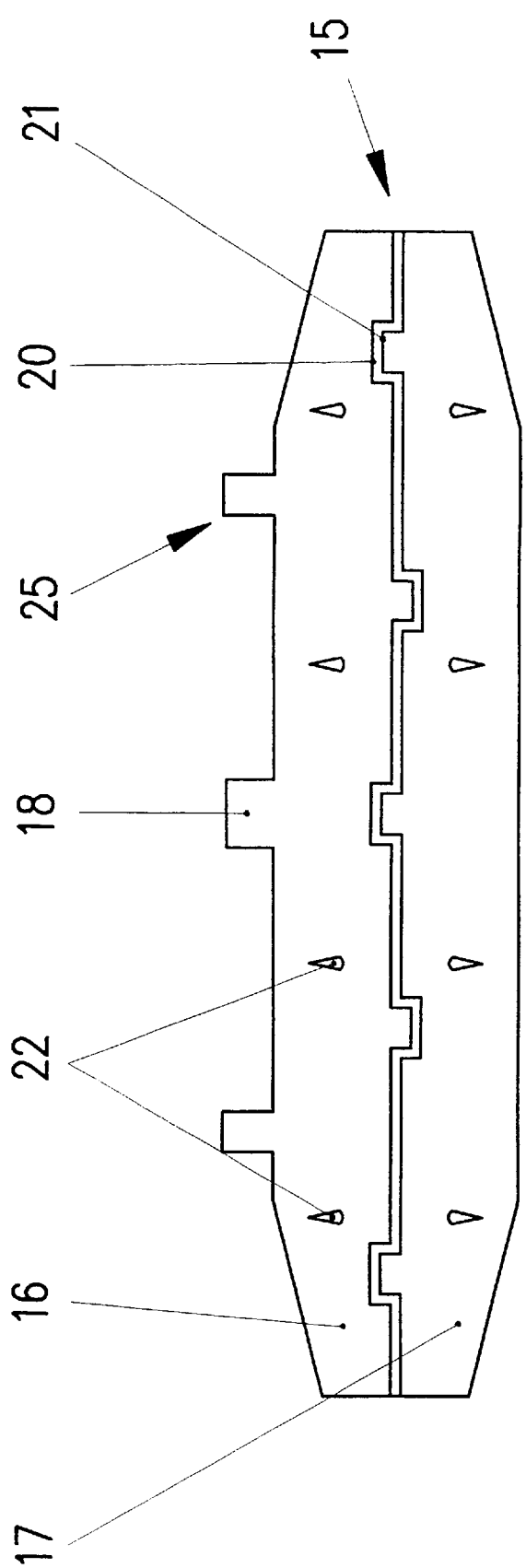
FIG. 4 illustrates a side view of the sleeve arranged on the seismic cable, partially in section.

FIG. 4 illustrates the interlockable status of the two halves 16 and 17 having grooves 20 and tongues 21 to ensure a water tight connection when pressed together. Guiding means or studs 22 on the outer surface of the sleeve distribute the wires of the armouring wires 12 surrounding the cable (FIG. 1) as well as the sleeve (FIG. 2).

Figure 5:
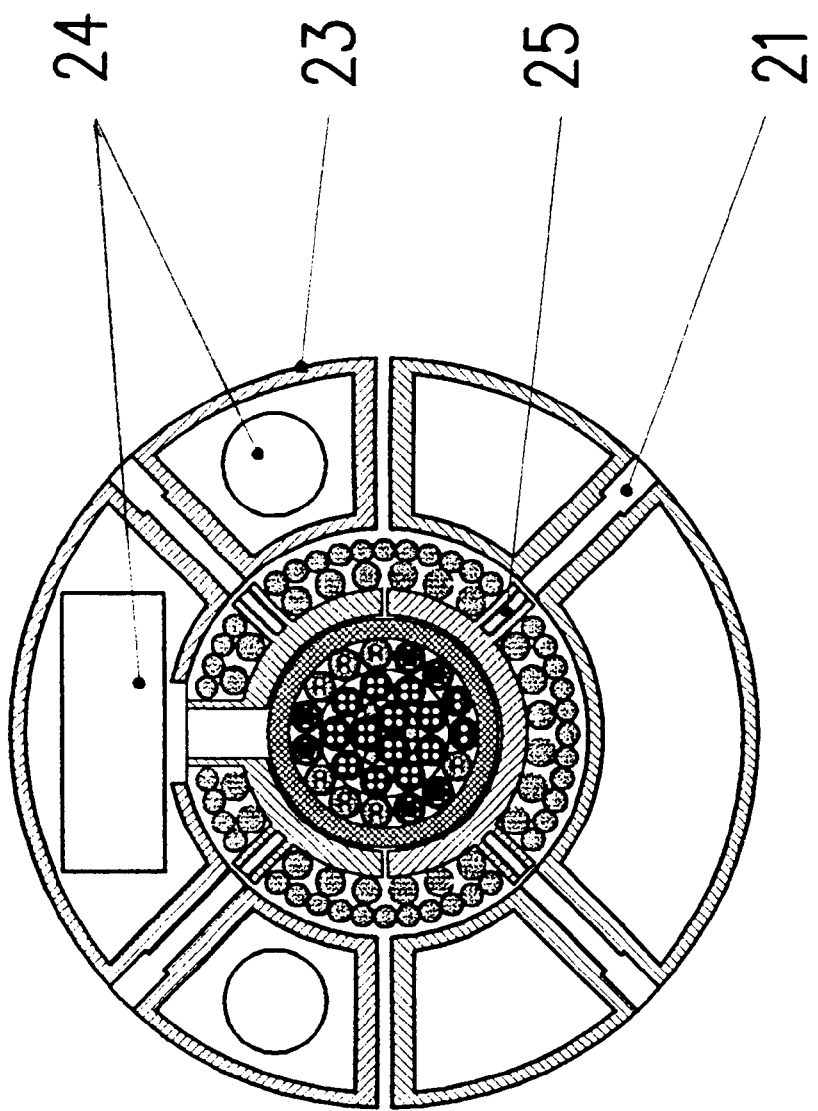
FIGS. 5 and 6 illustrate the seismic cable with a housing for the sensor elements outside the cable armouring.
Figure 6:
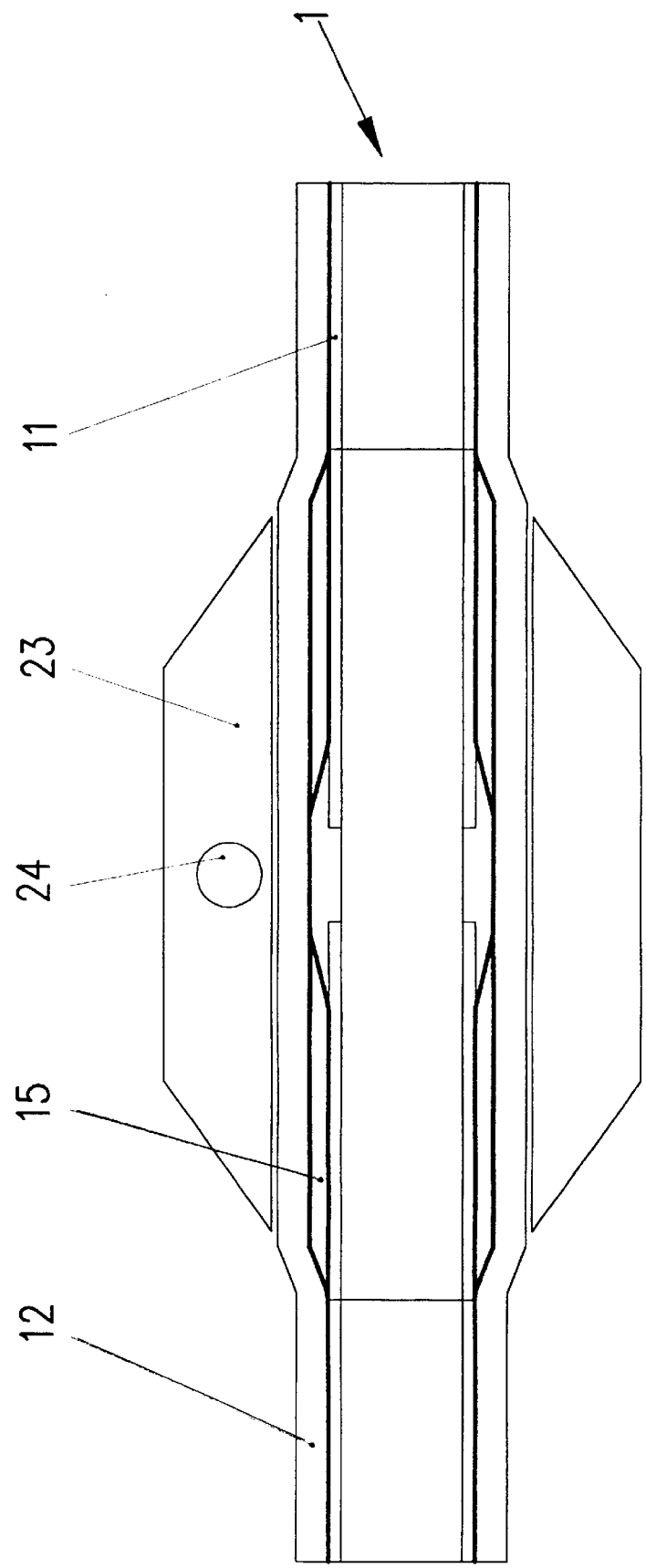

In accordance with the invention the sensor elements are to be installed outside of the armouring 12. Therefore, this armouring, at the location of the sleeve 15, is covered by a housing 23 (FIGS. 5, 6) within which the sensor devices 24 are integrated. The electrical/optical elements 19 inside the cable core and being guided through the outlet 18 of the sleeve 15 are to be interconnected with the sensor elements 24 inside the housing 23. The housing 23 and the sleeve 15 are e.g. interlockable by screws means 25 and known sealing means 27 (FIG. 3) between the individual parts to be connected will avoid any water penetration.

The above detailed description of embodiments of this invention must be taken as examples only and should not be considered as limitations on the scope of protection. The principles of the invention which have been described in connection with marine seabed laid seismic cables, can also be used in connection with towed seismic cables and on shore seismic cables.

What is claimed is:

1. A seismic cable including a plurality of electrical/optical elements which are arranged to be interconnected with a number of seismic sensor devices arranged at intervals along the cable, and protective outer armoring wires surrounding said elements and providing protection against radial stress of said cable, wherein guiding elements are provided for distributing the armoring wires.

2. A seismic cable according to claim 1, wherein said armoring wires are made from stranded steel wires.

3. A seismic cable according to claim 1, wherein a sleeve surrounds the electrical/optical elements and is provided with said guiding elements on its outer surface.

4. A seismic cable according to claim 1, wherein the sensor devices are installed in a housing arranged at intervals along the cable outside the armoring wires.

5. A seismic cable according to claim 1, wherein a polymeric sheath is replaced at intervals along the cable by sleeves surrounding the electrical/optical elements and has outlets for the electrical/optical elements to be interconnected with the sensor devices installed outside the armoring wires.

6. A seismic cable according to claim 1, further including sleeves surrounding the electrical/optical elements, wherein each sleeve consists of two interlockable halves having conical end portions.

7. A seismic cable according to claim 5, wherein the sleeves arranged below the armoring wires are interconnectable with the corresponding housing arranged above the armoring wires.

8. A seismic cable according to claim 7, wherein each sleeve and the corresponding housing are provided with interlockable through-holes for the electrical/optical elements to be interconnected with the corresponding sensor devices in the housing.

9. A seismic cable according to claim 5, wherein each sleeve is provided externally with the guiding elements for distributing the armoring wires on its outer surface.

10. A method for manufacturing a seismic cable according to claim 1, wherein, after bundling or stranding the electrical/optical elements with one another and surrounding the bundled electrical/optical elements by a sheath, the method comprises removing said sheath along the cable at intervals and replacing the removed sheath by sleeves, and bringing the electrical/optical elements to be connected with the sensor devices out of the sleeves through holes in said sleeves before providing said armoring wires to said cable, wherein the step of providing said armoring wires around said cable comprises the step of stranding the armoring wires around the sheath and the sleeves.

11. A method according to claim 10, wherein said armoring wires are made from stranded steel wires.

12. A method according to claim 10, wherein said guiding elements are provided on outer surfaces of said sleeves.

13. A method according to claim 10, wherein the sensor devices are installed in a housing arranged at intervals along the cable outside the armoring wires.

14. A method according to claim 10, wherein each sleeve comprises two interlockable halves having conical end portions.

15. A method according to claim 13, wherein the sleeves arranged below the armoring wires are interconnectable with a corresponding housing arranged above the armoring wires.

16. A method according to claim 15, wherein both the sleeve and the corresponding housing are provided with interlockable through-holes for the electrical/optical elements to be interconnected with the corresponding sensor devices in the housing.

* * * * *